UNITED STATES PATENT OFFICE.

CHARLES J. REED, OF GLENSIDE, PENNSYLVANIA.

METHOD OF TREATING SULPHIDE ORES.

1,415,897. Specification of Letters Patent. Patented May 16, 1922.

No Drawing. Application filed June 9, 1920. Serial No. 387,729.

*To all whom it may concern:*

Be it known that I, CHARLES J. REED, a citizen of the United States, residing at Glenside, in the county of Montgomery and State of Pennsylvania, have invented certain new and useful Improvements in Methods of Treating Sulphide Ores, of which the following is a specification.

This invention relates to the treatment of ores containing iron pyrites or other sulphides containing more than one equivalent of sulfur per equivalent of metal. The object of the invention is to provide a process, applicable to the treatment of a wide variety of complex ores, said process converting, at very low cost, the pyritic content of such ores into valuable products instead of valueless waste. In this connection it may be explained that the usual method of treating such ores is to heat or roast them in presence of air or oxidizing reagents: this converts the sulfur content partly into sulfur dioxid, which is commonly lost and at the same time vitiates the atmosphere, and partly into sulfuric anhydrid which largely remains in combination with the metals as sulfates. By this roasting the iron is converted into an impure and generally worthless oxid residue, from which certain of the associated metals may be extracted as sulfates, but from which small quantities of gold, silver and certain other metals cannot be economically recovered.

According to my improved process, I first crush the ore to a convenient size, for example lumps or particles about ¼″ in diameter. I then heat the ore in the absence of air or oxygen to a sufficient temperature, preferably a bright red heat. Temperatures of the order of 1000° C. or even higher are satisfactory in practice. Any suitable airtight receptacle of refractory material may be used for this purpose; for example such form of apparatus as is disclosed in my copending application Serial Number 253,343, filed September 9, 1918. To prevent access of air or oxygen I may with advantage keep the ore during the operation in an atmosphere of inert or reducing gas, such for instance as nitrogen, hydrogen, gaseous hydrocarbons or carbon monoxid.

By this operation a portion of the sulfur is volatilized as sulfur vapor, which passes from the apparatus and condenses upon cooling to elemental sulfur, constituting a valuable by-product. Certain other volatile substances, such as arsenic and arsenious sulphide, may be simultaneously eliminated. The residue now contains a lower sulphide of iron soluble in dilute sulfuric acid. The operation should be continued until this condition of solubility is atained.

The residue is now treated in any suitable acid-proof receptacle with dilute sulfuric acid, which may be either cold or hot, and is preferably but not necessarily of a specific gravity between 1.1 and 1.4. In this operation the residual ferrous sulphide is largely decomposed, yielding ferrous sulfate which passes into solution, and hydrogen sulphide which passes out as a gas. The copper, silver, lead and certain other metals if present, remain in the undissolved residue together with some iron. From this residue, after washing with water to remove the ferrous sulfate, the various metals may be economically separated by well known processes. The hydrogen sulphide may either be employed as a chemical reagent in other processes, or if desired it may be converted into elemental sulfur by burning one-third and combining the resulting products of combustion with the remaining two-thirds of the original gas, the reaction proceeding in accordance with the known equation

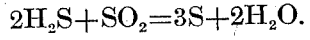
$$2H_2S + SO_2 = 3S + 2H_2O.$$

The ferrous sulfate solution, after removal from the undissolved residue by decantation, filtration or other approved methed, may be evaporated to recover the solid salt, which, after drying or dehydration, is roasted at red heat in presence of air or oxygen, whereby it is transformed into a valuable red oxid of iron and sulfuric anhydrid. The latter may be collected in the ordinary manner, in the form of sulfuric acid, and used to dissolve further quantities of the ferrous sulphide in a repetition of the process.

It will be observed that by the series of operations described above, the original pyrites is ultimately converted into two salable products, red oxid of iron and elemental sulfur, while the associated metals are left in highly concentrated form and in condition for ready recovery by known processes. The dilute sulfuric acid used for dissolving the sulphide is likewise regenerated for re-use; and no material other than fuel is either consumed or converted into valueless by-products.

It is obvious that I may add to the material to be treated any reagents or substances which may be necessary or advantageous in producing or maintaining the conditions herein described. For example I may add carbon to the ore in order to maintain or assist in maintaining a reducing atmosphere; and I may add sulfur to ores not containing it, or not containing it in sufficient quantity, so that for the purposes of this invention an ore containing an oxid of iron to which sulfur has been added, is to be regarded as an ore containing iron and sulfur.

I claim:—

1. The process of treating sulphide ores which comprises heating the same under non-oxidizing conditions to vaporize sulfur, treating the residue with sulfuric acid whereby hydrogen sulphide is evolved and metal sulfate is formed, and converting the metal sulfate to metal oxid and sulfuric anhydride.

2. Process of treating ores containing iron and sulfur, which comprises heating the same in the absence of free oxygen to vaporize a part of the sulfur content of the ore, dissolving the soluble portion of the residue in dilute sulfuric acid, and converting the ferrous sulfate thus formed into iron oxid and sulfuric anhydride.

3. Process of treating ores containing more than one equivalent of sulfur to each equivalent of iron, which comprises heating the ore in a non-oxidizing atmosphere to a bright red heat whereby sulfur is vaporized and a lower sulfid of iron is formed, treating the residue with dilute sulfuric acid whereby hydrogen sulphide is evolved and ferrous sulfate is formed.

4. Process of treating pyrite ores containing metals other than iron, which comprises heating said ores under non-oxidizing conditions whereby sulfur is vaporized and a lower sulphide of iron soluble in sulfuric acid is formed, treating the residue with dilute sulfuric acid whereby hydrogen sulphide is evolved, ferrous sulfate is formed and dissolved and a residue from which said other metals may be economically separated is produced.

5. The process of treating pyrite ores, which comprises heating the ore to a temperature of the order of 1000° C. or higher in the presence of a non-oxidizing gas, treating the heated ore with dilute sulfuric acid and separating the solution of ferrous sulfate so formed from the undissolved residue, converting the ferrous sulfate into ferric oxid and sulfuric anhydride, converting the sulfuric anhydride to sulfuric acid, and using the sulfuric acid so formed in a succeeding cycle of the process.

In testimony whereof, I affix my signature.

CHARLES J. REED.